Figure 1:
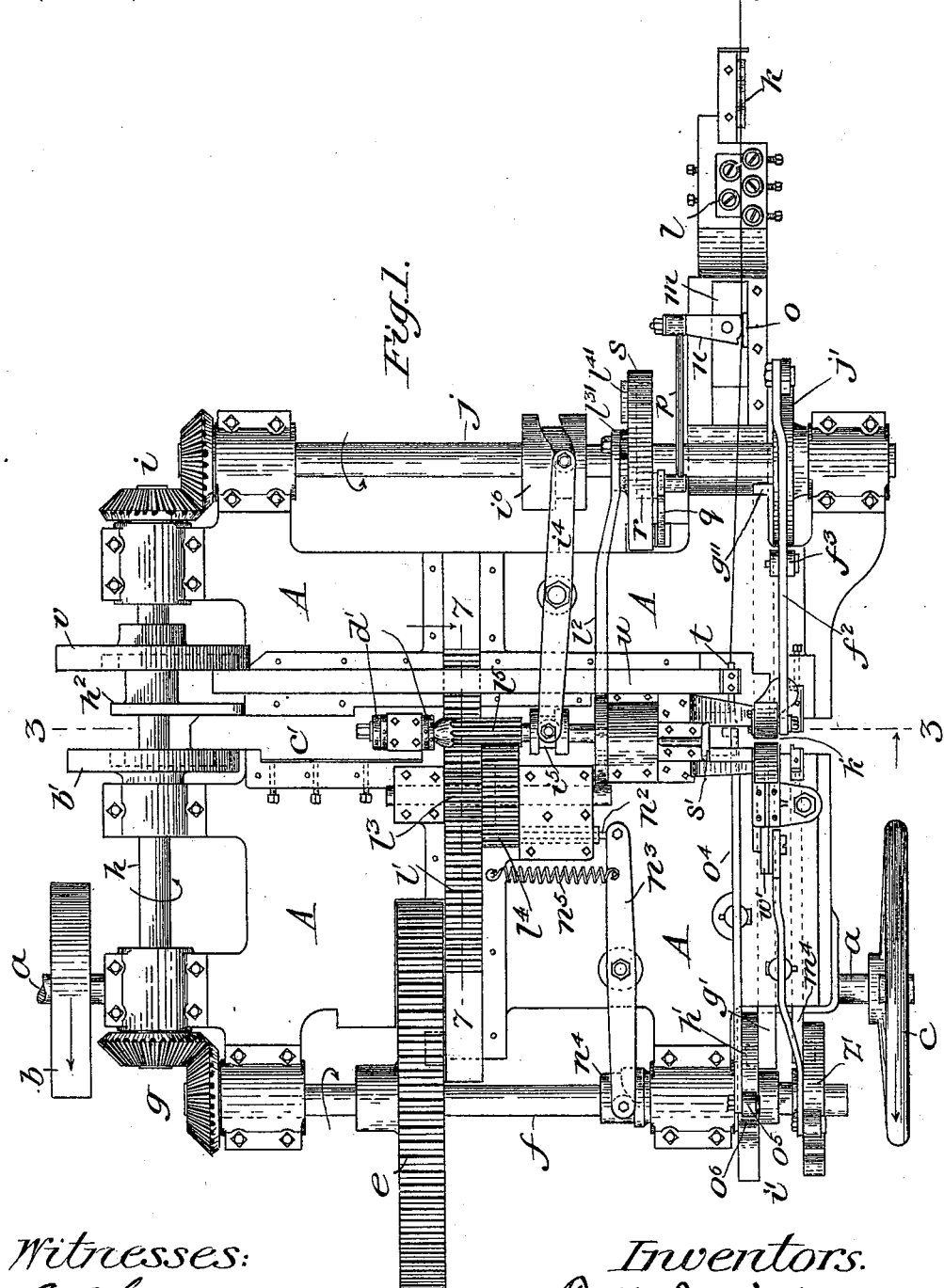

No. 652,953. Patented July 3, 1900.
F. H. DANIELS & C. S. MARSHALL.
MACHINE FOR MAKING BALE TIES.
(Application filed Feb. 19, 1900.)
(No Model.) 8 Sheets—Sheet 1.

Witnesses:
A. E. Grant
D. W. Edelin.

Inventors.
F. H. Daniels
C. S. Marshall
By Prince & Goldsborough
atty's

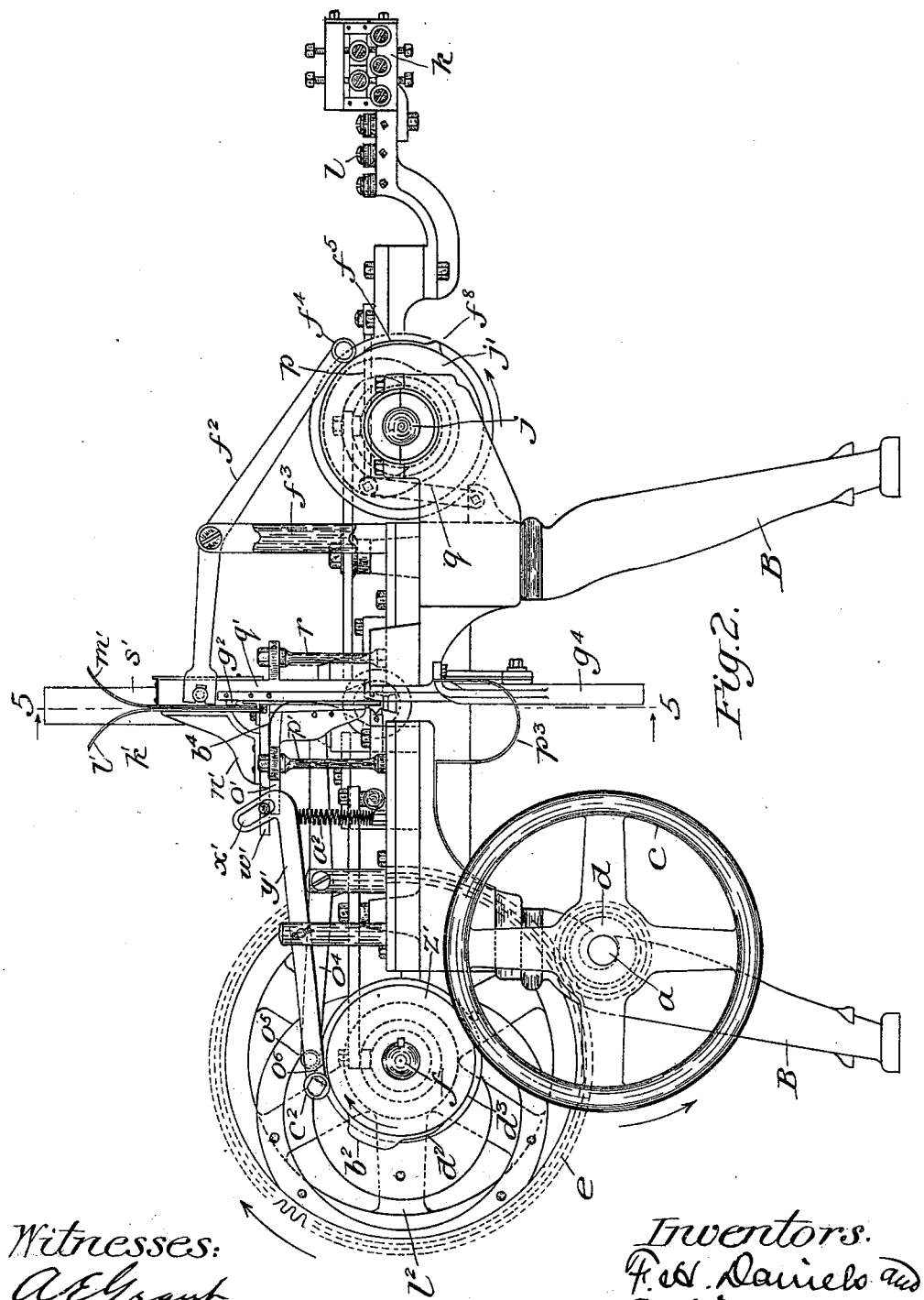

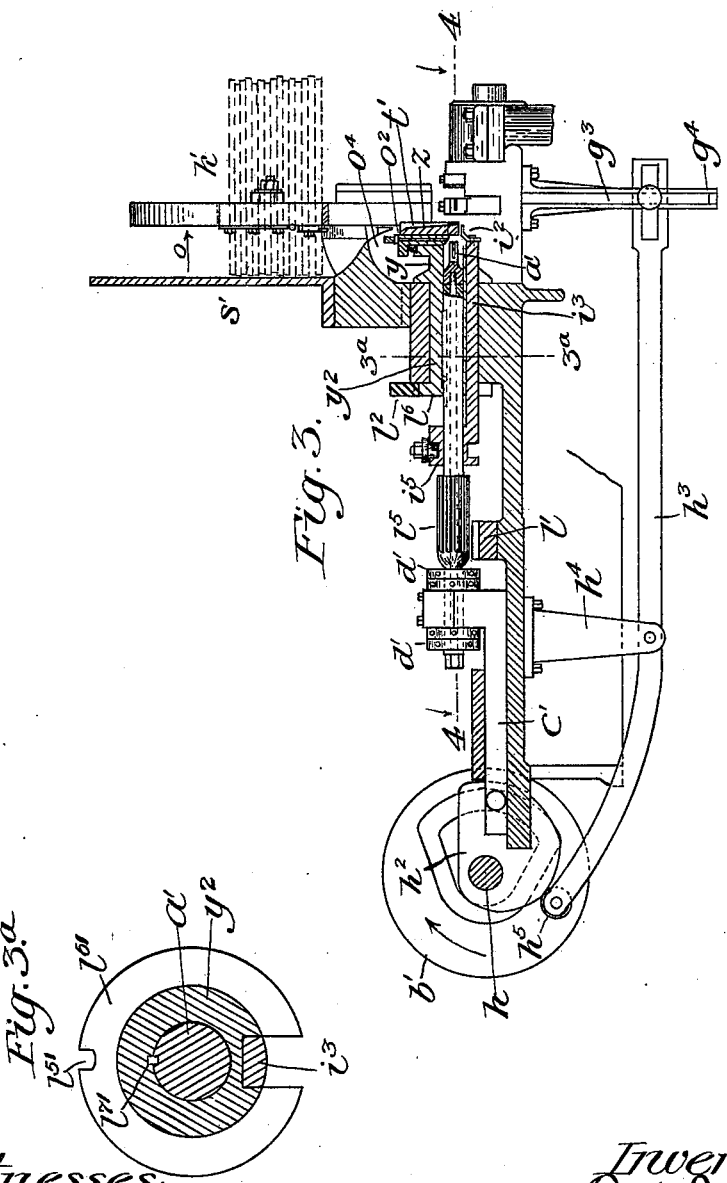

No. 652,953. Patented July 3, 1900.
F. H. DANIELS & C. S. MARSHALL.
MACHINE FOR MAKING BALE TIES.
(Application filed Feb. 19, 1900.)
(No Model.) 8 Sheets—Sheet 4.
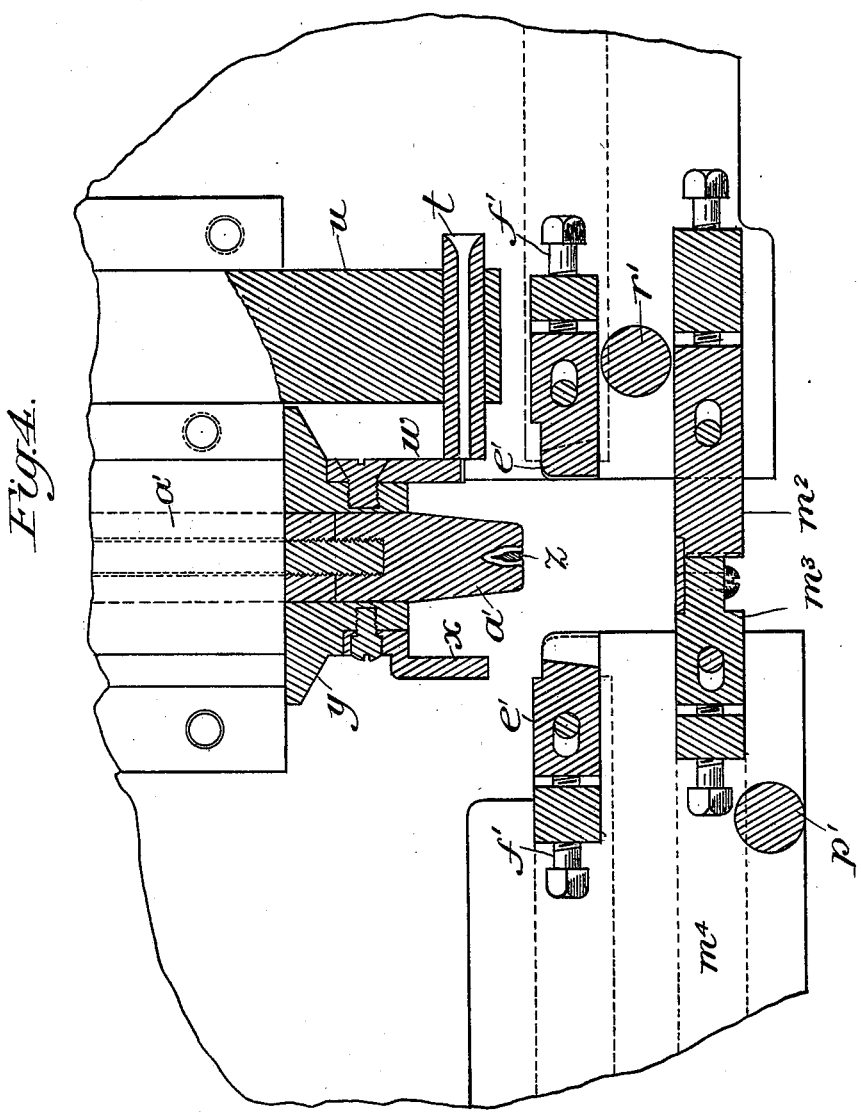

No. 652,953. Patented July 3, 1900.
F. H. DANIELS & C. S. MARSHALL.
MACHINE FOR MAKING BALE TIES.
(Application filed Feb. 19, 1900.)
(No Model.) 8 Sheets—Sheet 5.
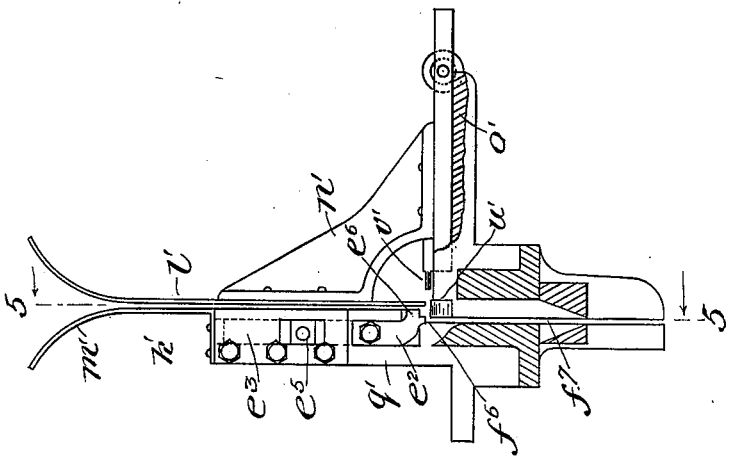
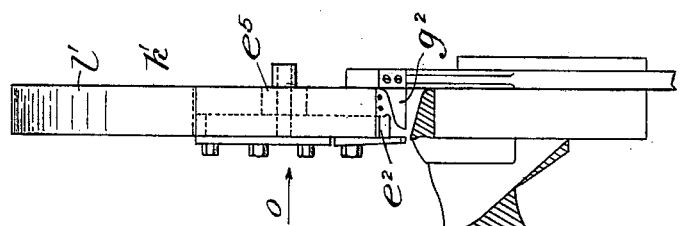
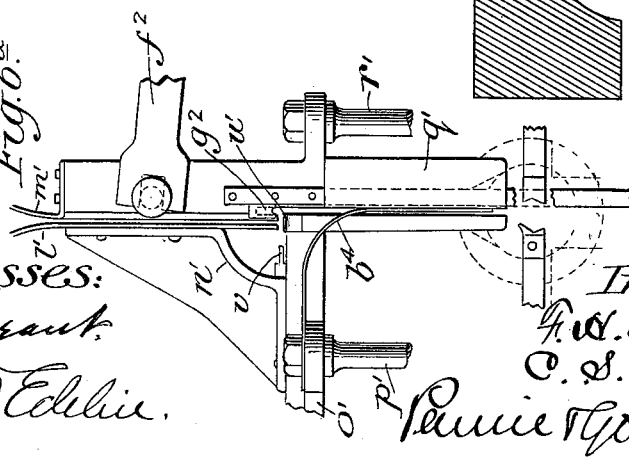

No. 652,953. Patented July 3, 1900.
F. H. DANIELS & C. S. MARSHALL.
MACHINE FOR MAKING BALE TIES.
(Application filed Feb. 19, 1900.)
(No Model.) 8 Sheets—Sheet 6.
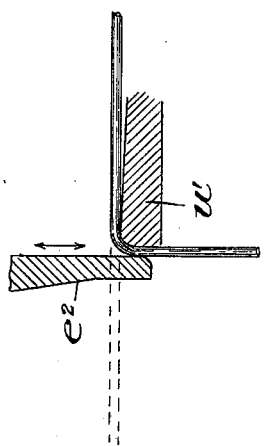
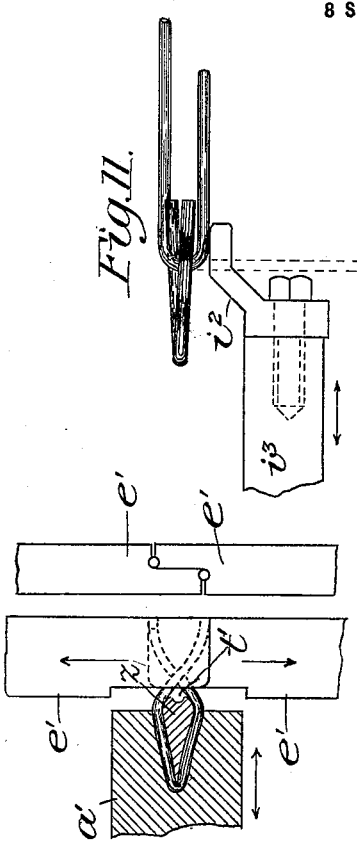
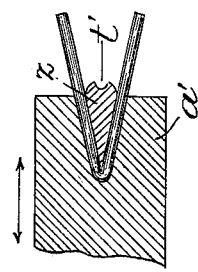
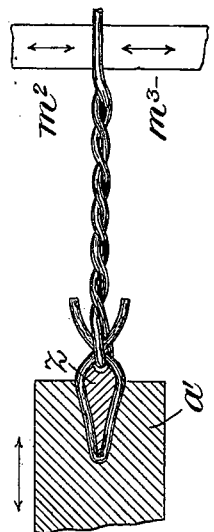
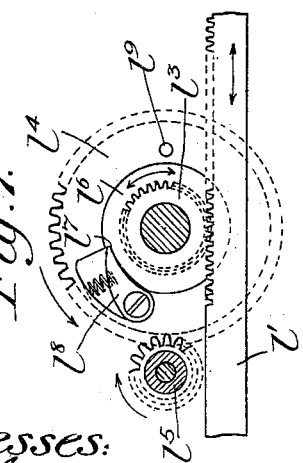
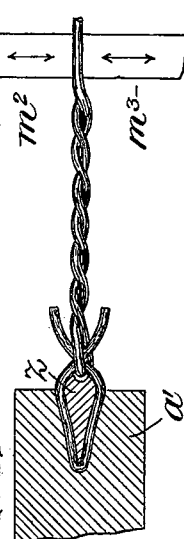
Witnesses:
A. E. Grant
D. W. Edelin
Inventors.
F. H. Daniels and
C. S. Marshall
by Pennie & Goldsborough attys
THE NORRIS PETERS CO., PHOTO-LITHO., WASHINGTON, D. C.

No. 652,953. Patented July 3, 1900.
F. H. DANIELS & C. S. MARSHALL.
MACHINE FOR MAKING BALE TIES.
(Application filed Feb. 19, 1900.)
(No Model.) 8 Sheets—Sheet 7.
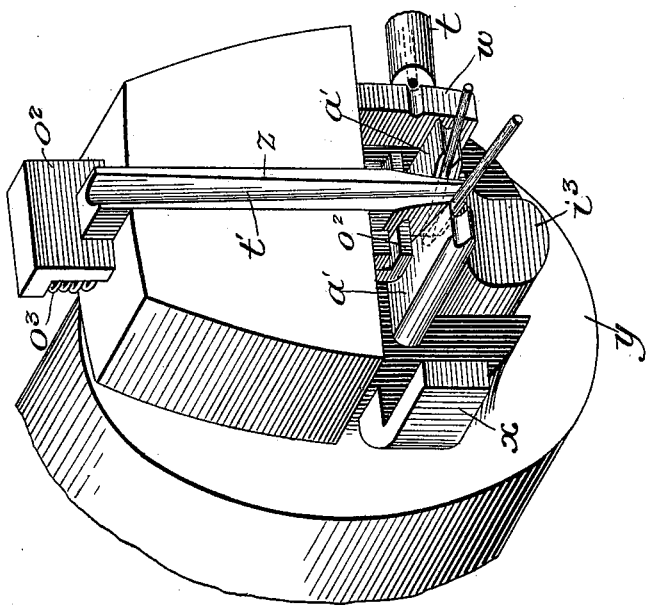
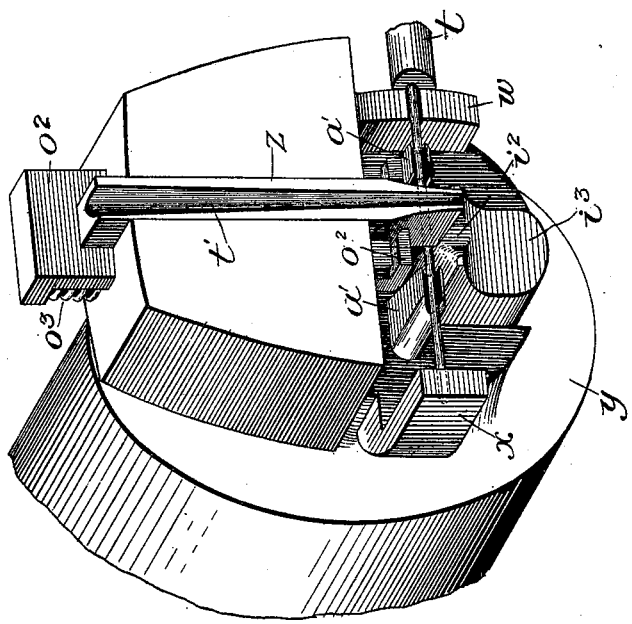

No. 652,953. Patented July 3, 1900.
F. H. DANIELS & C. S. MARSHALL.
MACHINE FOR MAKING BALE TIES.
(Application filed Feb. 19, 1900.)
(No Model.) 8 Sheets—Sheet 8.
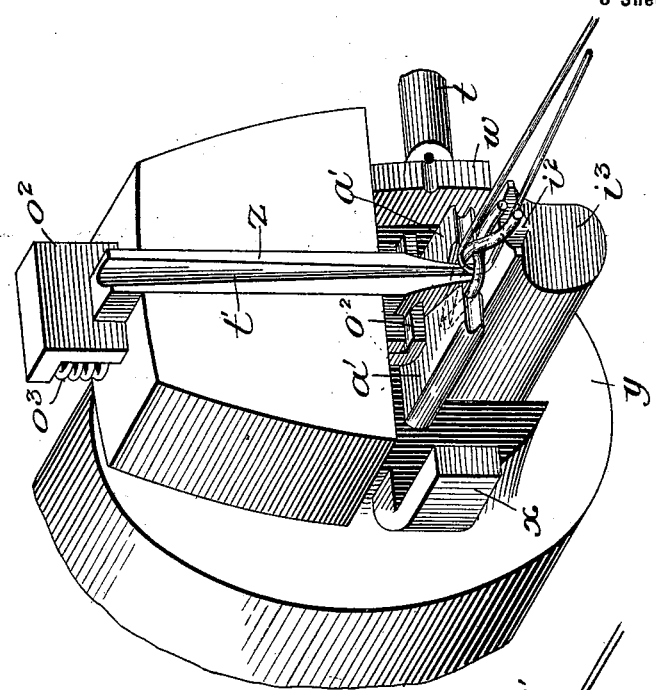
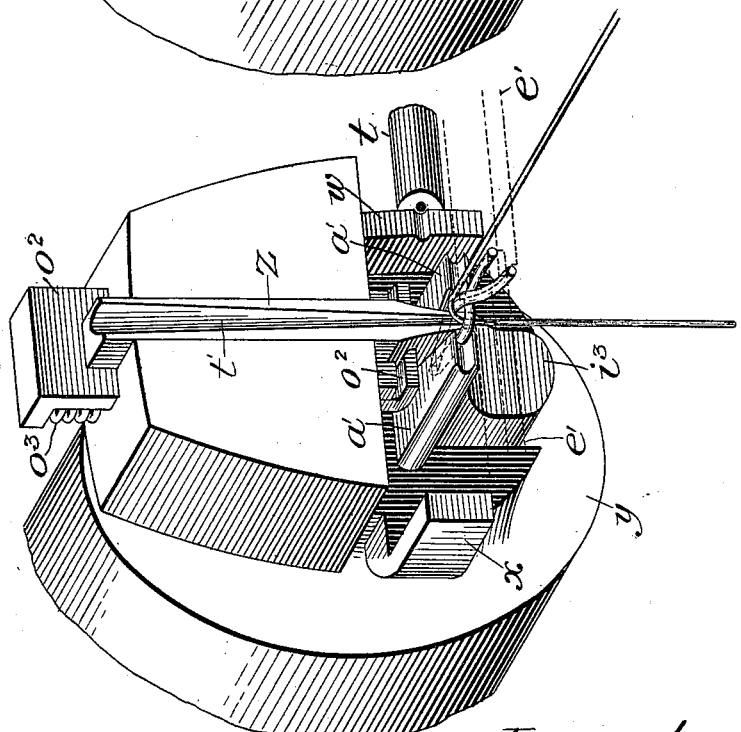
Witnesses:
Inventors.

UNITED STATES PATENT OFFICE.

FRED H. DANIELS AND CLINTON S. MARSHALL, OF WORCESTER, MASSACHUSETTS, ASSIGNORS TO THE AMERICAN STEEL AND WIRE COMPANY OF NEW JERSEY.

MACHINE FOR MAKING BALE-TIES.

SPECIFICATION forming part of Letters Patent No. 652,953, dated July 3, 1900.

Application filed February 19, 1900. Serial No. 5,746. (No model.)

*To all whom it may concern:*

Be it known that we, FRED H. DANIELS and CLINTON S. MARSHALL, citizens of the United States, residing at Worcester, in the county of Worcester and State of Massachusetts, (whose post-office address is Worcester, Massachusetts,) have invented certain new and useful Machines for Making Bale-Ties, of which the following is a specification.

The invention relates to certain new and useful improvements in and relating to machines for making bale-ties, and especially to machines for making ties of the kind patented to Fred H. Daniels, one of the applicants herein, August 9, 1898, No. 608,840, wherein the tie-wire is provided with a separate grip made of stouter wire bent in the form of a loop with overlapping ends, the loop being united to the tie-wire by passing the latter through it and twisting the projecting end of the tie-wire around the main portion. This has proved to be a very satisfactory form of tie; but there has heretofore been no machine devised for making it; and the prime object of the present invention is to provide a practical machine of high power and speed for automatically performing the several operations of forming the grip, passing the end of the tie-wire through its loop, bending the projecting end back upon the tie-wire, and twisting these portions of the tie-wire together, thereby greatly reducing the cost of manufacturing the ties and rendering their production on a large scale commercially profitable.

The general operation of the machine is as follows: Wire to form the grips is taken from a conveniently-located roll and fed into the machine and cut into lengths sufficient to form the grips. These cut lengths are then bent in the middle around a former or mandrel until their ends are brought together and overlapped, thereby forming a loop and completing the grip. The machine is provided with a magazine for holding a supply of tie-wires cut into proper lengths, and the next step in the formation of the ties after making the grips is to feed the tie-wires one at a time from the magazine and after bending the ends to thread them through the loops of the grips and turn them back upon the tie-wires. The tie-wires and their bent ends are then seized and held one at a time while the corresponding grip is rotated, so as to wrap or twist the two portions of the tie-wire together and at the same time complete the connection between the tie proper and the grip.

Specifically, the operation of the several parts of the machine will appear as the description proceeds.

The entire machine is illustrated in the accompanying drawings, forming part of this specification, wherein—

Figure 1 is a plan view, and Fig. 2 a front side view, of the complete machine. Fig. 3 is a vertical section taken on the line 3 3 of Fig. 1. Fig. 3ᵃ is a cross-section through the rotary head and looper, showing the connection between the looper-spindle, the fork-slide, and the head. Fig. 4 shows in section the looper head and spindle and the jaws or dies for completing the grips and holding the tie-wire ends, the section being taken on line 4 4 of Fig. 3. Fig. 5 is a vertical section of the tie-wire magazine, taken on line 5 5 of Figs. 2 and 6. Fig. 6 is a side elevation of the tie-wire magazine looking from the rear side of the machine in the direction of the arrow on Fig. 5. Fig. 6ᵃ is an outer side elevation of the magazine, showing the hook for carrying the tie-wire down to the looper and the spring holding it in the passage-way. Fig. 7 is a sectional detail on line 7 7 of Fig. 1 looking from the rear side of the machine. Figs. 8 and 9 are sectional details illustrating steps in the formation of the grips, the latter showing the operation of the dies for overlapping the ends of the looped wire to complete the grips. Fig. 10 is a detail illustrating the action of the jaw for bending the end of the tie-wire preliminarily to its insertion through the loop forming the grip, as shown on Fig. 11, which latter view illustrates the action of bending the projecting end of the tie-wire back upon the main length of the wire. Fig. 12 is a sectional detail showing a further step in the formation of the tie and intended more particularly to show the jaws for gripping and holding the tie-wire while the looper and grip are revolved for the purpose of putting the twist in the ends of the tie-wires by means of which the grips are fastened to the wires. Figs. 13 to 16 are perspective views of the rotary head and the looper, showing the parts in different positions in the operation of forming the grips.

Referring to the views, A denotes the bed-plate of the machine. It is of generally rectangular form, as best illustrated in Fig. 1, and has suitable projections for supporting the bearing-boxes of the shafting. This bed-plate is supported in a horizontal position upon suitable legs or standards at the four corners. The main shaft of the machine is denoted by $a$. It is journaled underneath the bed-plate at one end of the machine and has a pulley $b$ at one end by means of which it is rotated by power and at its other end is provided with a hand-wheel $c$ for the purpose of turning the machine by hand when occasion requires. A pinion $d$ on the shaft $a$ drives the gear $e$ and rotates the shaft $f$. At one end this shaft communicates motion by suitable miter-gears $g$ to a shaft $h$, journaled in suitable boxes at the rear side of the machine, and having at its opposite end a similar miter-gear connection $i$ with a shaft $j$, lying parallel with the shaft $f$ at the opposite end of the machine. Motion is communicated from these three shafts to all the operative parts of the machine in a manner which will appear in detail as the description proceeds.

Beginning with the introduction into the machine of the wire out of which the grips are formed, $l$ and $k$ denote suitable guiding and straightening rolls, through which a strand of wire passes from the coil located at any convenient point. From these rolls the wire passes into a feeder consisting of a block $m$, sliding in ways in the bed-plate and having pivoted to it a jaw $n$, which grips the wire against a fixed lug $o$ and feeds the wire intermittently forward. The jaw $n$ is connected, by means of a link $p$, with the lever $q$, which is pivoted at its lower end to brackets on the bed-plate and has a roller $r$ projecting laterally from its side into a cam-groove in the side face of the cam $s$, fastened on the shaft $j$. The lever $q$ is oscillated by the rotation of the cam $s$ and reciprocates the lever $n$ and block $m$ back and forth, gripping the wire and feeding it forward and releasing it and going back to take a new hold in a manner well understood in this class of machines.

The wire next passes through a tubular guide $t$, by means of which it is presented to the mechanism immediately concerned in the formation of the grips. This guide is carried in the front end of a slide $u$, working in suitable ways in the bed-plate, and reciprocated by the cam $v$ on the shaft $h$ into a groove in the side face of which plays a roller projecting laterally from the rear end of the slide. At the beginning of the operation guide $t$ stands in the position indicated in Figs. 1 and 4, and as the wire is fed therethrough it passes over the face of a knife-plate $w$ and its end abuts against a stop $x$. When the wire strikes the stop, the guide $t$ is moved rearwardly, its delivery end passing close to the knife $w$, and the portion of the wire extending between the guide end and the stop is cut off. The knife and stop are secured at diametrically-opposite points to a rotating head $y$, which carries a mandrel or former $z$, extending radially therefrom and which at the time of feeding the wire stands perpendicularly thereto. The head $y$ also carries a looper $a'$, which reciprocates axially through the head and also revolves with it. The forward end of this looper is forked or provided with a V-shaped groove, and the mandrel is of the same general shape in cross-section. At the time the wire is fed through the guide $t$ the looper is withdrawn into the position indicated in Figs. 3 and 13, and the wire passes across the forked end of the looper and between it and the rear edge of the mandrel $z$. Immediately after the cutting off of the length of the wire to form the grip the looper is thrust forward by means of the cam $b'$ on the shaft $h$ into a groove in the side face of which fits a roller on the end of a slide $c'$, connected to the rear end of the looper-spindle and working in suitable ways in the bed-plate. The rear end of the looper-spindle is threaded, and suitable devices $d'$ are provided for adjusting its connection with the front end of the slide $c'$, so as to accurately determine the extent of throw of the fork end of the looper. The mandrel projects into the path of movement of the looper, as shown in Fig. 3, and immediately that the length of wire necessary to form a grip is cut off the looper is thrust forward by the means just described into the position best indicated in Figs. 4 and 14, thus bending the wire around the mandrel with its ends projecting, as shown in the several figures. This is the first step in the formation of the loop, and at this point in the operation of the machine the projecting ends of the wire loop are gripped between oppositely-moving dies $e'$ $e'$, which are connected by adjusting means $f'$ to slides $g'$ $g''$, working in suitable ways in the bed-plate. The slide $g'$ has at its outer end a roller $h'$, which projects into a cam-groove in the side face of a cam $i'$, secured on the shaft $f$, and the slide $g''$ has a similar connection with a cam-groove in the side face of a cam $j'$ on the shaft $j$. These cams are so shaped and timed in their operation as to bring the dies $e'$ $e'$ together in line with the center of the looper $a'$ and on the opposite side of the mandrel from the looper, as best shown in Fig. 9, and the purpose of this is to complete the grip by closing the ends of the looped wire and overlapping them past each other, as explained in the aforesaid Daniels patent and as clearly represented in Figs. 9 and 12 herein. Up to this point in the operation of the machine the rotating head $y$ has remained in the position indicated in Fig. 3 and there has been no rotation of the same or of the looper or mandrel, the grip being formed entirely by the bending of the cut lengths of wire around the mandrel $z$ by the described action of the looper $a'$ and the dies $e'$ $e'$. The next step in the operation of the machine is the connection of the formed grips with the tie-wires, and this will now be explained.

It will be remembered that the wire out of which the grips are formed is fed in a single strand intermittently. The tie-wires are, however, fed into the machine in cut lengths appropriate to the particular use for which the completed ties are intended, and in order that the operation of the machine may be continuous a supply of these tie-wire lengths is contained in a magazine $k'$, located at the front side of the machine and in the vertical plane of the looper. This magazine consists of two parallel side pieces $l'$ $m'$, the former being secured to a bracket $n'$, bolted to a plate $o'$, supported in elevated position on standards $p'$ from the bed-plate, and the latter being secured to a vertical post $q'$, supported by a standard $r'$, rising from the bed-plate on the opposite side of the magazine from the standard $p'$. The magazine is thus practically only a narrow slit or passage-way adapted to receive and contain a plurality of wires one upon another, but not wide enough to permit the wires to pass each other. The upper ends of the side pieces forming the magazine are preferably flared, as illustrated in Figs. 1 and 6, to facilitate the introduction of the wires, and it is only intended that the ends of the wires where the grips are to be attached shall be supported in the magazine, the main or body portion of the wires being held in a trough conveniently located at the front side of the machine in line with the magazine. The manner of loading the tie-wires into the magazine is illustrated in Fig. 3, where a stop-plate $s'$ (see also Figs. 1 and 2) is located a sufficient distance in the rear of the magazine to determine the distance the tie-wires are allowed to project through the same and also for the purpose of determining the length of a bend which is to be made in the ends of these wires, as will be explained farther on.

The magazine is provided with mechanism for ejecting the tie-wires therefrom one at a time, and at the completion of each of the grip-forming operations before described one of the tie-wires is fed from the lower end of the magazine down to the grip and its end is inserted through the loop of the latter and secured thereto in a manner which will be more fully explained presently. As before described, the rotating head $y$ has secured radially on its outer end the mandrel or former $z$, on and around the lower end of which the grip is formed by the combined operation of the looper $a'$ and the dies $e'$ $e'$. Extending lengthwise along the front edge of this mandrel is a guide-groove $t'$, and at the completion of each grip-forming operation the mandrel stands vertically in line with the passage through the magazine and close against the side of the same. At the bottom of the magazine there is a ledge $u'$ of a width considerably in excess of the width of the magazine itself. The lowermost wire in the magazine rests normally upon this ledge, and the end of the magazine stands just enough above the ledge to permit one wire at a time to be pushed laterally out of the magazine and over the ledge. For this purpose a finger $v'$ is arranged to slide crosswise under the bottom of the open end of the magazine and immediately above the ledge $u'$. The finger is secured to the front end of a slide $w'$, which moves in suitable ways in the plate $o'$ and has a roller projecting laterally from its rear end. This roller works in a slot $x'$ in the front end of a lever $y'$, which is pivoted to a post rising from the bed-plate of the machine and is operated at its other end by risers on the periphery of a cam $z'$ on the end of the shaft $f$. The roller end of the arm is pressed upon the cam by a spring $a^2$, and the inclination of the slot $x'$ is such that the depression of the front end of the arm withdraws the slide $w'$ and retracts the finger $v'$. The cam $z'$ moves in the direction of the arrow in Fig. 2, and the finger $v'$ is held between the lower end of the magazine and the ledge $u'$ until the riser $b^2$ strikes the roller $c^2$, when the finger $v'$ is withdrawn into the position shown in Fig. 6, so as to allow one of the tie-wires to fall upon the ledge. The rotation of the cam $z'$ continuing, the roller $c^2$ next rides upon the riser $d^2$, and the finger $v'$ is thereby given a movement in a forward direction just sufficient to push the bottom tie-wire from under the end of the magazine off to the side of the ledge $u'$, across the edge of which works vertically a jaw $e^2$ for the purpose of bending the portion of the tie-wire projecting out of the rear side of the magazine downwardly at an angle to the main wire, as illustrated in Fig. 10. This jaw $e^2$ is connected to a slide $e^3$, which works in a suitable guide in the vertical post $q'$, forming one side of the magazine, and is operated by risers on the cam $j'$ through the intermediacy of a lever $f^2$, pivoted on a post $f^3$ and having a roller $f^4$ at its end, a spring being preferably provided to keep the roller on the cam. The cam $j'$ revolves in the direction of the arrow in Fig. 2, and the roller $f^4$ first rides on the riser $f^5$, slightly depressing the jaw $e^2$ for the purpose of closing, by means of its toe $f^6$, the vertical passage-way $f^7$, extending downwardly and guiding the tie-wires into proper position to the mandrel and the formed loop, as will be presently more fully described. The roller $f^4$ next rides upon the riser $f^8$, thus giving the jaw $e^2$ a further downward movement and causing its edge $e^6$ to bend the projecting end of the tie-wire downwardly over the edge of the ledge $u'$, as indicated in Fig. 10. The jaw $e^2$ then immediately rises, and the roller $c^2$ on the end of the lever $y'$ falls onto the lowest part $d^3$ of the cam $z'$, thereby giving the finger $v'$ a further forward movement for the purpose of pushing the bent tie-wire off the edge of the ledge $u'$ and into the passage-way $f^7$, and just prior to this last forward movement of the finger $v'$ the jaw $e^2$ rises, so as to permit the tie-wire to fall into the passage-way. The finger $v'$ then remains in this position until the riser $b^2$ on the cam $z'$ lifts the roller $c^2$ and withdraws the finger to its fullest extent. The tie-wire is now ready to have its bent end passed through the loop of the grip, and to insure this threading of the end through the loop the passage $f^7$, leading from the bottom of the magazine downwardly, coincides with the groove $t'$ in the mandrel $z$, and working in the passage $f^7$ is a hook $g^2$, secured to a slide $g^3$, guided in ways in the post $q'$ and the bracket-like extension $g^4$ under the bed-plate and operated from the cam $h^2$ on the shaft $h$ by means of a lever $h^3$, pivoted to a bracket $h^4$ under the bed-plate and connected with the slide $g^3$ and having a roller $h^5$, which is preferably spring-pressed against the cam $h^2$. The hook $g^2$ takes the tie-wire immediately that it has been pushed into the passage $f^7$ by the finger $v'$ and carries it downwardly until its bent end is passed through the grip, while the latter is held by the looper and the dies $e'\ e'$. A band-spring $b^4$ is secured at one end to the plate $o'$ and rests against the edge of the post $q'$, alongside the passage $f^7$. As the wires are carried down by the hook $g^2$ this spring holds them and prevents them from accidentally getting away from the hook. Immediately that the end is passed through the grip the hook $g^2$ returns to its former position above the upper end of the guide $f^7$, ready to catch the next tie-wire and leaving the end projecting through the grip. At this point a jaw $i^2$, secured to the forward end of a slide $i^3$, working in a groove in the rotary head $y$, is pushed forward along the under side of the looper $a$ and bends the threaded end of the tie-wire back upon the wire itself, as shown in full lines in Fig. 11. The slide $i^3$ is operated by means of a pivoted lever $i^4$, which is connected to a yoke $i^5$ at the rear end of the slide and has a roller on its opposite end playing in a groove in a cam $i^6$ on the shaft $j$. This completes the connection between the grip and the tie-wire, and it only remains to fasten the same securely together by twisting the portions of the tie-wire together. For this purpose the looper $a'$ and the head $y$, together with the mandrel $z$ and the knife $w$ and wire-stop $x$, are made rotatable by means of a gear-rack $l'$, sliding in ways in the bed-plate and operated by means of a roller projecting laterally from its end into the cam-groove on the main gear $e$. As this rack reciprocates and it is desirable that the looper should revolve in one direction only, the rack engages with a pinion $l^3$, having a ratchet-and-pawl connection with a gear $l^4$, which gears directly into the pinion $l^5$ on the looper-stem, which pinion is elongated, as shown, for the purpose of permitting the stem to slide to and fro. The gear $l^4$ preferably has a circular recess in its side adjoining the pinion $l^3$, and this pinion has a disk $l^6$, which fits into this recess and is provided with a tooth $l^7$. A spring-pressed pawl $l^8$ on the wheel $l^4$ engages this tooth when the pinion $l^3$ revolves in one direction, and the looper-spindle is thereby revolved; but when the rack $l'$ returns the pinion $l^3$ is rotated in the opposite direction and the tooth $l^7$ slips past the pawl without rotating the wheel $l^4$. Immediately after the bending of the end of the tie-wire by the jaw $i^2$ the two portions of this wire are seized between a fixed and movable jaw $m^2\ m^3$, each being provided with suitable adjusting devices and the jaw $m^3$ being connected with a slide $m^4$, operated by a cam-groove in the side face of the cam $z'$. Immediately after the grasping of the tie-wires in this way the dies $e'\ e'$ recede and the looper begins to turn, carrying with it the head $y$, the mandrel $z$, the jaw $i^2$, and the completed grip. The result of this revolution of the looper and the grip is that the portions of the tie-wire between the grip and the jaws $m^2\ m^3$ are twisted together, as indicated in Fig. 12. As many revolutions of the looper and head may be given as is necessary to form the desired number of twists in the wire, and at the completion of the operation the looper is left with the mandrel standing vertically in the position shown in Fig. 3, with its groove $t'$ corresponding with the guide $f^7$, leading from the magazine. In order to insure the stoppage of the rotating devices in this position, the gear $l^4$ is provided with a hole $l^9$ and a pin $n^2$, which is connected to one end of the pivoted lever $n^3$ and is arranged to be thrust into this hole to lock the parts in position at the moment that the desired revolutions of the looper are completed. The pin is operated by the lever $n^3$, whose opposite end works against a cam $n^4$ on the shaft $f$, a spring $n^5$ being arranged to force the pin into the hole and the cam acting to withdraw it at the proper moment. An optional or additional arrangement for stopping the looper in the proper position is provided, consisting of a pivoted lever $l^2$, having a roller $l^{31}$ at its rear end acted on by a cam $l^{41}$ on the shaft $j$. The front end of the lever enters a notch $l^{51}$ in the rear flange $l^{61}$ of the sleeve $y^2$, on the front end of which the head $y$ is carried. This notch is so located that when the end of the lever $l^2$ enters it the looper stands in proper position to begin a new grip. The stem of the looper is connected by a groove and spline $l^{71}$ with the sleeve $y^2$, so that it may slide therethrough and rotate the sleeve also. The tie, with the grip connected to it, having now been completed, the looper $a'$ and the fork $i^2$ are withdrawn into the rotary head by the means already described, leaving the loop on the lower end of the mandrel, as shown in Fig. 12. At this point the loop is stripped from the mandrel by a stripper $o^2$, which straddles the lower end of the mandrel and slides in a groove in the rotary head behind the mandrel, a spring $o^3$ being provided for the purpose of keeping the stripper withdrawn. The stripper revolves with the head and looper, and when the looper stops the upper end of the stripper comes under the end of a pivoted lever $o^4$, which has a roller $o^5$ on its opposite end and is operated by a riser $o^6$ on the cam $i'$ to depress the stripper and push the completed grip off the mandrel. Just before the stripper descends the jaws $m^2 m^3$ open and the completed tie falls into the receptacle $p^3$ under the machine.

In making the following claims to the above-described machine we do not desire or intend to be limited to the particular construction of the individual devices except where so specified, as in the general combinations and arrangements considerable latitude is allowed in varying the details of the mechanical constructions.

Having thus described our invention, what we claim, and desire to secure by Letters Patent, is—

1. In a machine for making wire ties, the combination of wire-feeding mechanism, mechanism for cutting off suitable lengths of the wire, mechanism for bending the cut lengths into loop form to make the grips, mechanism for passing the ends of the tie-wires through the grips, and mechanism for twisting the ends of the tie-wires together.

2. In a machine for making wire ties, the combination of wire-feeding mechanism, mechanism for cutting off suitable lengths of the wire, a former or mandrel, a looper for bending the cut lengths around the mandrel or former to make the grips, mechanism for passing the ends of the tie-wires through the grips, and mechanism for twisting the tie-wire ends together.

3. In a machine for making wire ties, the combination of wire-feeding mechanism, mechanism for cutting off suitable lengths of the wire, a mandrel or former, a looper for bending the cut lengths around the mandrel or former to make the grips, mechanism for passing the ends of the tie-wires through the grips, mechanism for bending the tie-wire ends back upon the wire, and mechanism for twisting the ends of the tie-wires together.

4. In a machine for making wire ties, the combination of wire-feeding mechanism, mechanism for cutting off suitable lengths of the wire, a mandrel or former, a looper for bending the wire around the mandrel or former to make the grips, mechanism for passing the ends of the tie-wires through the grips, mechanism for bending the tie-wire ends back upon the wire, and mechanism for rotating the grips and thereby twisting the tie-wire ends together.

5. In a machine for making wire ties, the combination of wire-feeding mechanism, mechanism for cutting off suitable lengths of the wire, a mandrel or former, mechanism for looping the wire around the mandrel or former to make the grips, mechanism for passing the ends of the tie-wires through the grips, mechanism for bending the tie-wires back upon the wire, mechanism for rotating the grips and thereby twisting the tie-wire ends together, and mechanism for stripping the grips from the mandrel.

6. In a machine for making wire ties, the combination of wire-feeding mechanism, mechanism for cutting off suitable lengths of the wire, a mandrel or former, mechanism for looping the wire around the mandrel or former to make the grips, mechanism for passing the ends of the tie-wires through the grips, mechanism for bending the tie-wire ends back upon the wire, mechanism for gripping and holding the tie-wire, and mechanism for rotating the grips and thereby twisting the tire-wire ends together.

7. In a machine for making wire ties, the combination of wire-feeding mechanism, mechanism for cutting off suitable lengths of the wire, a mandrel or former, a looper for bending the wires around the mandrel or former to make the grips, dies for closing the ends of the grips, mechanism for passing the ends of the tie-wires through the grips, mechanism for bending the tie-wire ends back upon the wire, jaws for clamping and holding the tie-wire, mechanism for rotating the grips and thereby twisting the tie-wire ends together while so holding, and mechanism for releasing the tie-wires and stripping the grips from the mandrel.

8. In a machine for making wire ties, the combination of wire-feeding mechanism, mechanism for cutting off suitable lengths of the wire, mechanism for bending the cut lengths into loop form to make the grips, a magazine for holding cut lengths of tie-wires, mechanism for ejecting the tie-wires one at a time from the magazine and passing their ends through the grips, and mechanism for bending the ends of the tie-wires back and twisting the tie-wire ends together.

9. In a machine for making wire ties, the combination of wire-feeding mechanism, mechanism for cutting off suitable lengths of the wire, mechanism for bending the cut lengths into loop form to form the grips, a magazine for holding cut lengths of tie-wires, mechanism for ejecting the tie-wires out of the magazine one at a time and bending their ends, mechanism for feeding the tie-wires laterally so as to pass the bent ends through the grips, mechanism for bending the tie-wire ends back on the wire, clamps for holding the ends of the tie-wire, and mechanism for rotating the grips and thereby twisting the tie-wires together.

10. The combination of the reciprocating wire-guide, and the rotating head having the knife, the wire-stop, the mandrel, and the reciprocating looper.

11. The combination of the reciprocating wire-guide, and the rotating head having the knife, the wire-stop, the mandrel, the reciprocating looper, and mechanism for locking the rotating head.

12. The combination of the reciprocating wire-guide, and the rotating head having the knife, the wire-stop, the mandrel, the reciprocating looper, and the dies for completing the grips.

13. The combination of the reciprocating wire-guide, and the rotating head having the knife, the wire-stop, the mandrel, the reciprocating looper, the dies completing the grips, and the stripper.

14. The combination of the rotary head, the recipcocating looper, the rack $l'$, the pinion $l^3$ engaging the rack, the elongated looper pinion $l^5$, the wheel $l^4$, the ratchet-and-pawl connection between the wheel and pinion $l^3$, and mechanism for reciprocating the looper.

15. The combination of the mandrel having a guide-groove in its face, the passage-way parallel therewith, and the hook for passing the wires down through the groove and passage-way.

16. The combination of the rotary head, the reciprocating looper, the rack $l'$, the pinion $l^3$ engaging the rack, the looper-pinion, the wheel $l^4$, and the ratchet-and-pawl connection between the wheel and pinion.

17. The combination with the tie-wire magazine, of the ledge, the finger for ejecting the wires one at a time from the magazine across the ledge, and the reciprocating jaw for bending the wire over the edge of the ledge.

18. The combination with the tie-wire magazine, of the ledge, the finger for ejecting the wires one at a time from the magazine across the ledge, and the reciprocating jaw $e^2$ for bending the wire over the edge of the ledge, the jaw having a toe $f^6$ to confine the wire.

19. The combination of the tie-wire magazine, the ledge, the reciprocating jaw having the toe $f^6$ and the edge $e^6$, and mechanism for operating the plunger first to confine the wire and next to bend the same over the corner of the ledge.

20. The combination with the tie-wire magazine, of the ledge, the guide-passage leading therefrom, the finger for ejecting the wires one at a time from the magazine over the ledge into the passage-way, and the hook for carrying the wires downward.

21. The combination with the tie-wire magazine, of the ledge, the guide-passage leading therefrom, the finger for ejecting the wires one at a time from the magazine over the ledge into the passage-way, the hook for carrying the wires downward, and the spring for holding the wires up to the action of the hook.

22. The combination of the tie-wire magazine, the ledge, the plunger having the toe $f^6$ to confine the wire, and the jaw $e^6$ to bend the same over the edge of the ledge, the finger $v'$, and mechanism for operating the finger to eject the wire from the magazine under the jaw.

23. The combination of the tie-wire magazine, the ledge, the plunger having the toe $f^6$ to confine the wire and the jaw $e^6$ to bend the same over the edge of the ledge, the finger $v'$, and mechanism for operating the finger first to eject the wire from the magazine under the jaw, and then to give it a further movement to push the wire from under the jaw off the ledge.

24. In a machine for making wire ties, the combination of wire-feeding mechanism, mechanism for cutting off suitable lengths of the wire, mechanism for bending the cut lengths into loop form to make the grips, mechanism for passing the ends of the tie-wires through the grips, and mechanism for rotating the grips and thereby twisting the tie-wire ends together.

25. The combination of a mandrel having a guide-groove in its face, the magazine, means for bending the ends of the tie-wires, the passage-way leading from the magazine, and the hook for passing the wires down through the passage-way with their bent ends in the groove.

26. The combination of the reciprocating wire-guide, the rotating head having the knife, the mandrel, and the reciprocating looper.

27. The combination with the tie-wire magazine, of the ledge, the reciprocating jaw to bend the end of the wire over the ledge, the passage leading downward from the ledge, the finger for ejecting the wires one at a time from the magazine over the ledge into the passage-way, and the hook for carrying the wires downward.

In testimony whereof we have hereto set our hands this 15th day of February, 1900.

FRED H. DANIELS.
CLINTON S. MARSHALL.

Witnesses:
 H. V. DORSEY,
 FRANK E. DAVIS.